(12) United States Patent
Kleindiek

(10) Patent No.: US 6,741,011 B1
(45) Date of Patent: May 25, 2004

(54) ELECTROMECHANICAL DRIVE ELEMENT COMPRISING A PIEZOELECTRIC ELEMENT

(76) Inventor: Stephan Kleindiek, Markwiesenstrasse 55, 72770 Reutlingen (DE)

( * ) Notice: Subject to any disclaimer, the term of this patent is extended or adjusted under 35 U.S.C. 154(b) by 0 days.

(21) Appl. No.: 09/914,901

(22) PCT Filed: Mar. 3, 2000

(86) PCT No.: PCT/EP00/01843
§ 371 (c)(1),
(2), (4) Date: Sep. 4, 2001

(87) PCT Pub. No.: WO00/54004
PCT Pub. Date: Sep. 14, 2000

(30) Foreign Application Priority Data

Mar. 6, 1999 (DE) .......................... 199 09 913

(51) Int. Cl.[7] ............................... H01L 41/08
(52) U.S. Cl. ................................. 310/323.02
(58) Field of Search ................. 310/328, 323.02, 310/323.16

(56) References Cited

U.S. PATENT DOCUMENTS 5,319,257 A    6/1994  McIntyre
5,712,524 A *  1/1998  Suga .......................... 310/328
5,726,520 A *  3/1998  Grahn ......................... 310/328

FOREIGN PATENT DOCUMENTS

| DE | 40 15 196 A | 11/1990 |
| EP | 0 112 454 A | 7/1984 |
| EP | 0 460 387 A | 12/1991 |
| EP | 0 611 485 B1 | 4/1996 |
| GB | 2 314 452 A | 12/1997 |
| WO | 96 17430 A | 6/1996 |
| WO | 98 18169 A | 4/1998 |

* cited by examiner

*Primary Examiner*—Mark Budd
(74) *Attorney, Agent, or Firm*—Michael J. Striker

(57) ABSTRACT

The invention relates to an electromechanical drive element which comprises a rotor that is received in a bearing and at least one piezoelectric element that is impinged upon with an electric voltage. Said bearing is provided with a rotor seat that is mounted on a bearing block and that can be rotated to a limited extent. Said rotor seat is rotated by the extension and/or contraction of the at least one piezoelectric element that is evoked by the electric voltage.

13 Claims, 1 Drawing Sheet

ELECTROMECHANICAL DRIVE ELEMENT COMPRISING A PIEZOELECTRIC ELEMENT

The invention concerns an electromechanical drive element, in particular for the exact positioning of an object in the nanometer to centimeter range, comprising a rotor supported in a bearing element and at least one piezoelectric element that can be acted upon with an electric voltage.

EP 0 611 485 B1 makes known a linear motor comprising a piezoelectric element that is suited to positioning a tip of a needle-like probe down to a range of the atomic order on a surface of an object. This known positioning element is unusual in that the probes can move with high precision in the nanometer range while, at the same time, travelling greater adjusting paths in the centimeter range. As such, it avoids the disadvantages of traditional devices such as guide play, reversing play, drift, susceptibility to vibration, or oversizing.

The known positioning element is only conditionally suited to changing the angular position of an object, however. To accomplish this, the positioning elements must be used with corresponding coupling elements to the object to be positioned, such as a probe. Additionally, only small angular adjustments can be achieved.

The present Invention is based on the object of creating an electromechanical drive element that can adjust the angular position of objects with high precision using minimal structural expenditure.

The object is solved according to the invention using an electromechanical drive element of the type described initially in that the bearing element has at least one rotor receptacle supported on a bearing block in a fashion that allows it to rotate with limits, which rotor receptacle can be rotated by the expansion and/or contraction—induced by an electric voltage—of the at least one piezoelectric element.

The drive element according to the invention can be produced in very small dimensions, so that disruptions by temperature or external mechanical effects such as impact sounds are extremely minimal.

The at least one piezoelectric element changes its expansion under the influence of the electric voltage by approximately only one micrometer, so that the motions of the at least one rotor receptacle are extremely minimal. So that the rotor can also travel greater adjusting paths, the rotor can be supported in the at least one rotor receptacle in a manner that allows it to rotate with friction. The friction 17 between the rotor and the at least one rotor receptacle can thereby preferably be such that the rotor does not follow relatively rapid revolutions of the at least one rotor receptacle, but follows relatively slow revolutions of the at least one rotor receptacle. Therefore, if the rotor receptacle is moved slowly by the piezoelectric element, the rotor follows the motion. If, on the other hand, the rotor receptacle is moved relatively quickly by the piezoelectric element, the rotor can no longer follow the motion due to it inertia. Using successive, alternating slow and rapid motions of the rotor receptacle, a quasi continuous revolution of the rotor in the rotor receptacle can be achieved. The electrodes of the at least one piezoelectric element can be connected to a saw-tooth voltage generator for this purpose, which generates alternating slow and rapid expansions and contractions of the at least one piezoelectric element and, therefore, revolutions of the at least one rotor receptacle, whereby the rotor follows the slow revolutions and does not follow the rapid revolutions.

Preferably the at least one rotor receptacle can be a bearing ring that is supported on the bearing block by way of multiple fixed members. The fixed members form flectors, which gives the element high mechanical stability. In traditional arrangements, forces transferred to the piezoelectric element from the outside, in particular forces transverse to its direction of expansion, can destroy the fragile piezoelectric crystal. The flectors formed by the fixed members can absorb such transverse forces, however, so that the piezoelectric crystal is not destroyed.

A further advantage of this arrangement lies in the fact that the flectors do not need to guide the parts to be moved and thereby generate restoring forces. The restoring forces of the fixed members only act upon the piezoelectric element and are also very small, because the piezoelectric element expands or contracts by approximately only one micrometer. Since the fixed members do not grip the rotor, arbitrarily big angular adjustments of the rotor can be achieved as well.

In a further advantageous design, the bearing element can have two bearing rings as rotor receptacles supported on bearing blocks by way of multiple fixed members in which the ends of the rotor are supported, whereby at least one of the bearing rings can be rotated by means of at least one piezoelectric element. It is therefore also possible to drive the rotor from both sides or from one side only, whereby the second bearing ring then serves as a pure abutment. In every, case, the two bearing rings form two friction bearings that are pressed against the rotor, which makes it possible for the rotor to rotate without play. Precise adjustments in the nanometer range can also be achieved as a result.

In another design, the bearing element can have a piezoelectrically driven bearing ring for accommodating one end of the rotor and a lower-friction abutment for the other end of the rotor. Particularly precise motions can be achieved using such a design.

To reduce the friction, the rotor can also have tapering ends. They can be designed as spherical cups, for example. If the rotor is driven on only one side, it is advantageous If the spherical cup on the abutment has a smaller diameter.

A preferred embodiment of a drive element according to the invention will be described below in greater detail using the diagram.

Figure 1:
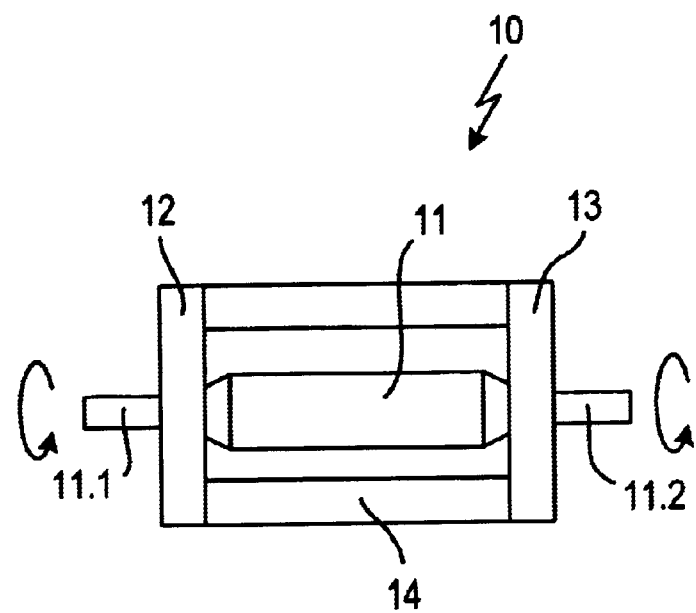
FIG. 1 shows a side view of a drive element according to the invention.

The drive element 10 from FIG. 1 has a rotor 11 with tapering ends 11.1 and 11.2 that are supported in two bearing elements 12 and 13. The two bearing elements 12 and 13 are connected with each other by way of braces 14. Together they form the bearing element for the rotor 11. The bearing elements 12 and 13 are thereby pressed against the rotor in springy fashion.

Figure 2:
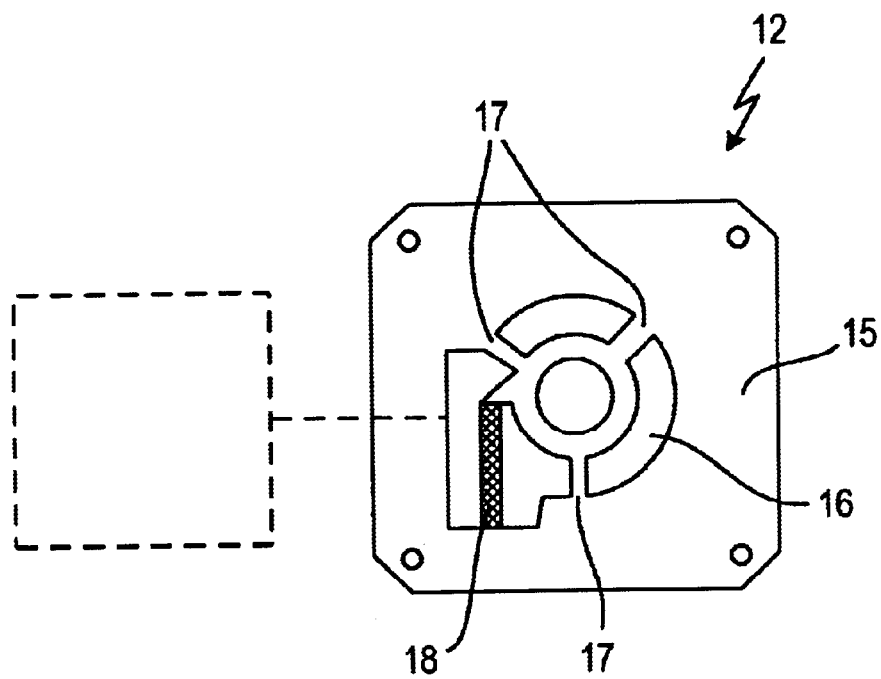
FIG. 2 shows an internal view of a bearing element of the drive element from FIG. 1.

In the internal view of the bearing element 12 from FIG. 2 it is obvious that it is formed from a bearing block 15, to which a bearing 16 is fastened as rotor receptacle by way of three fixed members 17. The rotor 11, which is not shown in FIG. 2, is then inserted in the bearing ring 16. Using a piezoelectric element 18, the electrodes of which are connected with a saw-tooth voltage generator, for example, in a fashion not shown in greater detail, the bearing ring 16 can be set into rotation by expansion and contraction of the piezoelectric element 18, whereby the fixed elements 17 act as flectors. The rotor 11 is supported in the bearing ring 16 with friction in such a fashion that it can follow slow revolutions of the bearing ring 16, but cannot follow rapid motions due to its inertia. Using slow motions of the bearing ring 16, the rotor can therefore be adjusted in very small angular adjustments, while large angular adjustments or even a continuous revolution of the rotor 11 can be achieved by alternating between rapid and slow motions of the bearing ring 16.

The drive element 10 shown is therefore suited to positioning an object with very small angular adjustments as well as with large angular adjustments.

The second bearing element 13 can be designed exactly the same as the bearing element 12, but it can also form a simple abutment for the rotor, whereby, advantageously, the friction between the rotor 11 and the abutment 13 is less than between the rotor 11 and the bearing ring 16.

What is claimed is:

1. Electromechanical drive element for the exact positioning of an object in the centimeter range, comprising a rotor (11) supported in a bearing element and at least one piezoelectric element (18) that can be acted upon with an electrical voltage, wherein the bearing element (12, 13, 14) comprises at least one rotor receptacle (16) supported on a bearing block (15) in a fashion that allows it to be rotated within limits, wherein said rotor receptacle (16) can be rotated by the expansion and/or contraction—induced by an electric voltage—of the at least one piezoelectric element (18), wherein the rotor (11) is supported in the at least one rotor receptacle (16) in a fashion that allows it to be rotated with friction, and wherein the friction between the rotor (11) and the at least one rotor receptacle (16) is such that the rotor (11) does not follow relatively rapid revolutions of the at least one rotor receptacle (16), but follows relatively slow revolutions of the at least one rotor receptacle (16), wherein the bearing element (12, 13, 14) has a piezoelectrically driven bearing ring (16) to accommodate one end (11.1) of the rotor (11), and a lower-friction abutment for the other end (11.2) of the rotor (11).

2. Electromechanical drive element for the exact positioning of an object in the centimeter range, comprising a rotor (11) supported in a bearing element and one single piezoelectric element (18) that can be acted upon with an electrical voltage, wherein the bearing element (12, 13, 14) comprises at least one rotor receptacle (16) supported on a bearing block (15) in a fashion that allows it to be rotated within limits, wherein said rotor receptacle (16) can be rotated by the expansion and/or contraction—induced by an electric voltage—of the one single piezoelectric element (18), wherein the rotor (11) is supported in the at least one rotor receptacle (16) in a fashion that allows it to be rotated with friction, and wherein the friction between the rotor (11) and the at least one rotor receptacle (16) is such that the rotor (11) does not follow relatively rapid revolutions of the at least one rotor receptacle (16), but follows relatively slow revolutions of the at least one rotor receptacle (16).

3. Drive element according to claim 1, characterized in that the at least one rotor receptacle is a bearing ring (16) that is supported on the bearing block (15) by way of multiple fixed members.

4. Drive element according to claim 1, characterized in that the bearing element (12, 13, 14) has two bearing rings (16) as rotor receptacles supported on bearing blocks (15) by way of multiple fixed members (17) in which the ends (11.1, 11.2) of the rotor (11) are supported, whereby at least one of the bearing rings (16) can be rotated by means of at least one piezoelectric element (18).

5. Drive element according to claim 1, characterized in that the electrodes of the at least one piezoelectric element (18) are connected to a saw-tooth voltage generator that generates alternating slow and rapid expansions and contractions of the at last one piezoelectric element (18) and, therefore, revolutions of the at least one rotor receptacle (16), whereby the rotor (11) follows the slow revolutions and does not follow the rapid revolutions.

6. Drive element according to claim 1, characterized in that the rotor (11) has tapering ends.

7. Drive element according to claim 6, characterized in that the rotor (11) has ends designed in the shape of spherical cups.

8. Drive element according to claim 2, characterized in that the at last one rotor receptacle is a bearing ring (16) that is supported on the bearing block (15) by way of multiple fixed members.

9. Drive elements according to claim 2, characterized in that the bearing element (12, 13, 14) has two bearing rings (16) as rotor receptacles supported on bearing blocks (15) by way of multiple fixed members (17) in which the ends (11.1, 11.2) of the rotor (11) are supported, whereby at least one of the bearing rings (16) can be rotated by means of the one piezoelectric element (18).

10. Drive element according to claim 2, characterized in that the bearing element (12, 13, 14) has a piezoelectrically driven bearing ring (16) to accommodate one end (11.1) of the rotor (11), and a lower-friction abutment for the other end (11.2) of the rotor (11).

11. Drive element according to claim 2, characterized in that the electrodes of the one piezoelectric element (18) are connected to a saw-tooth voltage generator that generates alternating slow and rapid expansions and contractions of the one piezoelectric element (18) and, therefore, revolutions of the at least one rotor receptacle (16), whereby the rotor (11) follows the slow revolutions and does not follow the rapid revolutions.

12. Drive elements according to claim 2, characterized in that the rotor (11) has tapering ends.

13. Drive element according to claim 2, characterized in that the rotor (11) has ends designed in the shape of spherical cups.

* * * * *